United States Patent
Chen et al.

(10) Patent No.: US 6,687,233 B1
(45) Date of Patent: Feb. 3, 2004

(54) RATE DETECTION IN DIRECT SEQUENCE CODE DIVISION MULTIPLE ACCESS SYSTEMS

(75) Inventors: Albert Chen, Sunnyvale, CA (US); Ingolf Held, Campbell, CA (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/343,647

(22) Filed: Jun. 29, 1999

Related U.S. Application Data

(60) Provisional application No. 60/104,652, filed on Oct. 16, 1998.

(51) Int. Cl.⁷ .............................................. H04L 12/26
(52) U.S. Cl. ....................................... 370/253; 375/225
(58) Field of Search ................................. 370/310, 320, 370/342, 328, 329, 331, 332, 333, 335, 431, 441, 230, 232, 241, 252, 253; 714/774, 780, 792, 794, 795; 375/225, 341, 240, 316

(56) References Cited

U.S. PATENT DOCUMENTS

| | | | | |
|---|---|---|---|---|
| 5,710,784 A | * | 1/1998 | Kindred et al. | 375/262 |
| 5,771,226 A | * | 6/1998 | Kaku | 370/232 |
| 5,774,496 A | * | 6/1998 | Butler et al. | 375/225 |
| 5,796,757 A | * | 8/1998 | Czaja | 714/789 |
| 6,112,325 A | * | 8/2000 | Burshtein | 714/774 |
| 6,167,079 A | * | 12/2000 | Kinnunen et al. | 370/232 |
| 6,175,590 B1 | * | 1/2001 | Stein | 370/252 |
| 6,208,699 B1 | * | 3/2001 | Chen et al. | 375/225 |
| 6,393,074 B1 | * | 5/2002 | Mandyam et al. | 375/341 |

* cited by examiner

*Primary Examiner*—Melvin Marcelo
*Assistant Examiner*—Derrick W Ferris
(74) *Attorney, Agent, or Firm*—Jack D. Slobod

(57) ABSTRACT

A method of rate detection at a receiving end of a code division multiple access (CDMA) system, in which system the effective data rate is variably selected at the transmitting end from an applicable rate set including a full rate and lower rates, each lower rate being the full rate divided by a different integer, and encoded symbols are repeated for the lower rates to maintain a constant apparent symbol transmission rate, includes the formation of scaled correlations between data entering a Viterbi decoder, after any required de-repetition, and re-encoded data at each of the possible data rates in the applicable rate set. Rate decision logic sequentially considers the full and lower candidate data rates in descending order, choosing the considered candidate data rate to be the actual data rate if certain conditions are met. A first of the conditions is whether the scaled correlation for the considered data rate plus a predetermined biasing threshold associated therewith is greater than or equal to the largest of the scaled correlations for the other data rates, and a second condition depends on whether CRC checking if available for the considered data rate. If CRC checking is available for the considered data rate, the second condition is satisfied if CRC checking has not failed. If CRC checking is not available, it is determined as the second condition whether the scaled correlation for the considered data rate is equal to or greater than a further predetermined threshold associated therewith.

20 Claims, 7 Drawing Sheets

TRANSMITTED FULL RATE
$E_b/N_t = 2.6dB$, RATE SET 1

RATE DETECTION IN DIRECT SEQUENCE CODE DIVISION MULTIPLE ACCESS SYSTEMS

RELATED APPLICATIONS

This application claims internal priority of the Provisional Application Number 60/104,652, filed Oct. 16, 1998.

BACKGROUND OF THE INVENTION

1. Field of the Invention

The present invention relates to methods of rate detection at a receiving end of a digital communications system, such as a code division multiple access (CDMA) system, in which system the information data rate is variably selected at the transmitting end from an applicable rate set including a full rate and lower rates, each lower rate being the full rate divided by a different integer, and data is repeated for the lower rates to maintain a constant apparent data transmission rate. In its particular aspects, the present invention relates to a rate detection method in which a rate determination or classification decision is made using measurements of data derived from data frames decoded, after de-repetition for the lower rates, at a plurality of possible data rates in the applicable rate set.

2. Description of the Related Art

Such a rate detection method is generally known from "An Overview of the Application of Code Division (CDMA) to Digital Cellular Systems and Personal Cellular Networks", submitted by Qualcomm Incorporated to the Telecommunication Industry Association (TIA) TR45.5 Subcommittee on Mar. 28, 1992. At page 30 of this document it is stated that at the mobile station, the decoder must process the received frame four times, making decode attempts at each of the four data rates in the rate set, and the microcontroller must decide what rate was sent using Cyclic Redundancy Code (CRC) checking results and Symbol Error Rate (SER) measurements provided by the decoder. This document does not indicate how SER measurements could be provided by the decoder.

In 1992, a direct sequence code division multiple access (DS-CDMA) system was adopted as Interim Standard 95 (IS-95) by the TIA for deployment in the cellular band at 800 MHz. After successful field tests and trial systems the IS-95 system is now operating with, tens of millions of subscribers.

CDMA is based on spread spectrum technology originally developed by the Allies during World War II to resist enemy radio jamming. Spread spectrum signals are characterized by, a bandwidth W occupied by signals in a channel much greater than the information rate R of the signals in bit/s. Thus, a spread spectrum signal inherently contains a kind of redundancy which can be exploited for overcoming several kinds of interference (including signals from other users in the same band and self-interference in the sense of delayed multipath components) introduced by the channel. Another key property of spread spectrum signals is pseudo-randomness. Therefore, the signal appears to be similar to random noise, making it difficult to demodulate by receivers other than the intended ones. In CDMA systems, users share a common channel bandwidth and users are distinguished by different code sequences. In the case of IS-95 each communication with a user is modulated or scrambled by long and short Pseudo Noise (PN) sequences and also modulated by a specific one of a set of orthogonal sequences, known as Walsh codes, which is assigned to the user. The latter modulation is known as applying a Walsh cover. Thus, a particular receiver can recover a certain transmitted signal by applying the PN sequences, and also the Walsh sequence used by the corresponding transmitter for the particular receiver.

In the IS-95 DS-CDMA system variable information data rates are used according to the voice activity detected by the voice encoder. This enables a reduction in transmitted power at the lower rates leading to a reduced average transmitted power per user and consequent increase in capacity of the system. Two sets of information data rates (Rate Sets 1 and 2) can be encoded, depending on the implemented voice encoder each set comprising full rate, and lower rates of half rate, quarter rate, and eighth rate. For the lower rates, symbols are repeated to achieve the same apparent symbol transmission rate as when full rate is used. The information data rate can change from frame to frame, but information indicating the currently used data rate is not transmitted along with the speech data. Therefore, the receiver has to detect the data rate by hypothesis testing. The algorithm implemented by rate classification or decision logic which determines which of the possible information data rates is utilized for the current frame is called a Rate Detection Algorithm (RDA).

Available information which can be used for rate detection includes repetition characteristics, CRC checking results (which in accordance with IS-95 are available for all data rates except quarter and eighth rates in Rate Set 1), Viterbi decoder survivor metrics, and correlations between re-encoded data and data entering the decoder for each possible data rate. In the case of the latter, the symbols in each data frame are de-repeated (for the lower possible data rates), Viterbi decoded, and convolutional re-encoded in accordance with each of the possible data rates in the applicable rate set, and separate scaled correlations between the re-encoded data and the (de-repeated where required), data entering the Viterbi decoding are formed for each possible data rate.

An RDA employing correlations between re-encoded data and data entering the decoder for each possible data rate in an applicable rate set was employed in a CDMA cellular handset manufactured by Philips Consumer Communications, L.P. That algorithm had rate classification logic utilizing thirteen different thresholds or constants to distinguish between the data rates of IS-95 Rate Set 1 and also utilized Cyclic Redundancy Code (CRC) checking results for full and half rates.

OBJECTS AND SUMMARY OF THE INVENTION

It is an object of the present invention to provide an improved rate detection method in which correlations are formed between re-encoded data and data entering the Viterbi decoding for a plurality of possible data rates in an applicable rate set, which method employs rate classification logic having significantly fewer thresholds or constants per rate set than the previously used logic.

It is a further object of the invention that the rate detection method is highly accurate and reliable under expected operating conditions, such as the presence of noise and fading.

The foregoing and other objects are satisfied by providing such a rate detection method wherein the rate classification logic includes first determining whether or not the transmitted data rate is the full rate by checking if first conditions are satisfied, one of the first conditions being whether the full rate correlation plus a predetermined first threshold is greater than, or greater than or equal to, a maximum of the lower rate correlations. A further one of the first conditions is whether a Cyclic Redundancy Code check with respect to the decoded received convolution encoded data does not fail.

If the first determination is that the data rate is not the full rate, the rate decision logic proceeds to second determining whether or not the transmitted data rate is the largest of the lower possible rates by checking if second conditions are satisfied, one of the second conditions being whether the lower rate correlation for the largest of the lower possible rates plus a predetermined second threshold is greater than, or greater than or equal to, a maximum of the full rate correlation and the other of the lower rate correlation. A further one of the second conditions is whether a Cyclic Redundancy Code check with respect to the decoded de-repeated received convolution encoded data for the largest of the possible lower data rates does not fail.

Then, if the second determination is that the data rate is not the largest of the lower possible rates, the rate decision logic proceeds to third determining whether or not the transmitted data rate is the second largest of the lower possible rates by checking if third conditions are satisfied, one of the third conditions being whether the lower rate correlation for the second largest of the lower possible rates plus a predetermined third threshold is greater than, or greater than or equal to, a maximum of the full rate correlation and the other of the lower rate correlations. A further one of the third conditions is either whether the lower rate correlation for the second largest of the possible lower rates is greater than, or is greater than or equal to, a further predetermined threshold (for Rate Set 1) or whether a Cyclic Redundancy Code check with respect to the decoded de-repeated received convolution encoded data for the second largest of the possible lower data rates does not fail (for Rate Set 2).

Similarly, if the third determination is that the data rate is not the second largest of the lower possible rates, then the rate decision logic proceeds to fourth determining whether or not the transmitted data rate is the third largest of the lower possible rates by checking if fourth conditions are satisfied, one of the fourth conditions being whether the lower rate correlation for the third largest of the lower possible rates plus a predetermined fourth threshold is greater than, or greater than or equal to, a maximum of the full rate correlation and the other of the lower rate correlations. A further one of the fourth conditions is either whether the lower rate correlation for the third largest of the possible lower rates is greater than, or is greater than or equal to, a still further predetermined threshold (for Rate Set 1) or whether a Cyclic Redundancy Code check with respect to the decoded de-repeated received convolution encoded data for the third largest of the possible lower data rates does not fail (for Rate Set 2).

When there are three possible lower data rates, as in Rate Sets 1 and 2, and the result of the fourth determining is that the data rate is not the third largest (or smallest) of the lower data rates, the data is rejected as invalid.

The result is rate classification or decision logic with only six thresholds for Rate Set 1 and four thresholds for Rate Set 2. Such rate classification or decision logic is not only simpler than the previously used logic, but also simulations indicate that highly reliable rate decisions are made under expected operating conditions.

Other objects, features and advantages of the present invention will become apparent upon perusal of the following detailed description when taken in conjunction with the appended drawing, wherein:

DETAILED DESCRIPTION OF THE PREFERRED EMBODIMENTS

Figure 1:
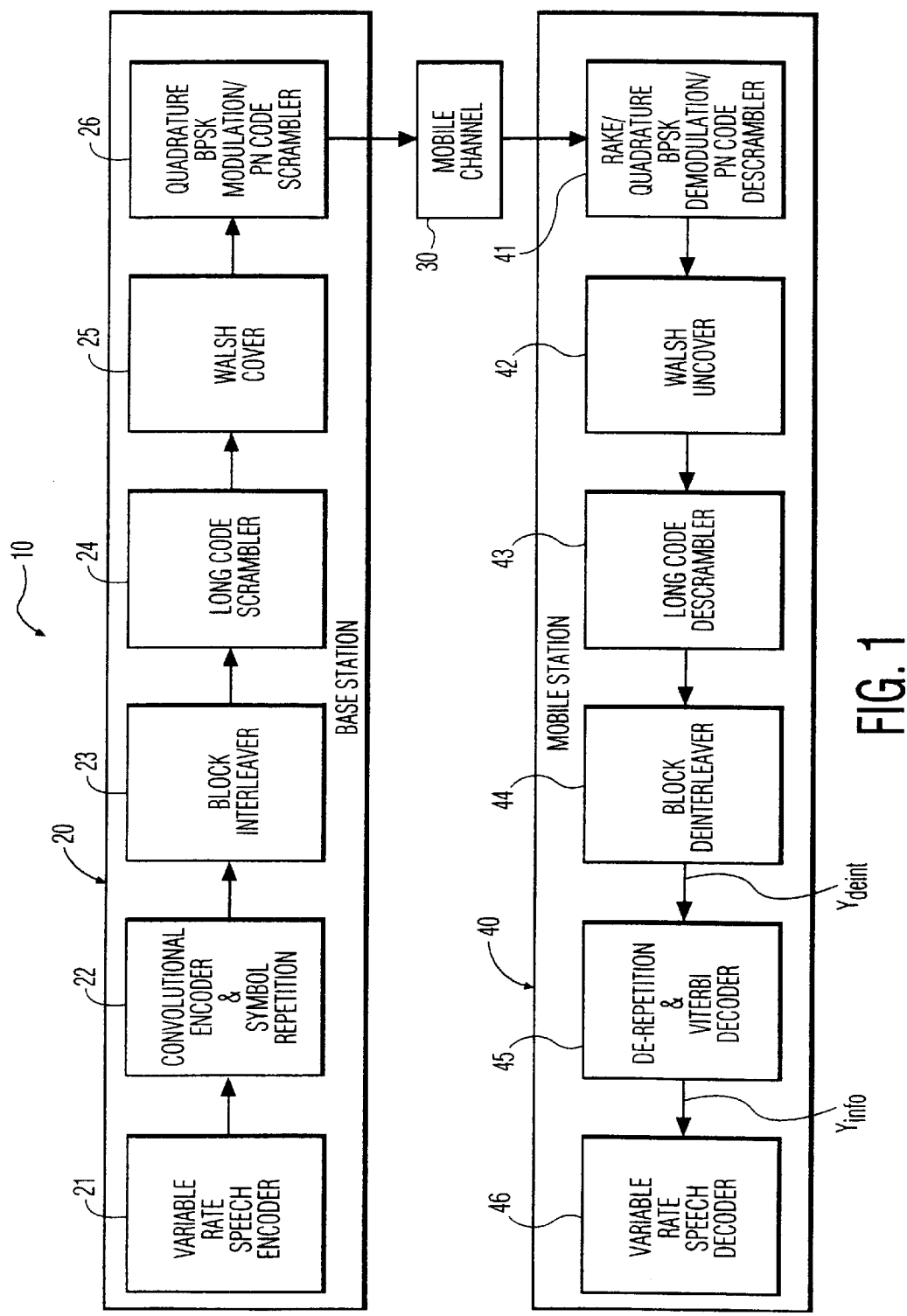
FIG. 1 is a basic functional schematic diagram of a DS-CDMA system including a transmitting end and a receiving end, the receiving end including a block performing de-repetition and Viterbi decoding.

Referring first to FIG. 1 of the drawing, a wireless CDMA cellular type system 10 is shown including at least one base station 20 and at least one mobile station 40, which at the level of detail shown, is conventional. For the sake of explanation, base station 20 is taken as the transmitting end and mobile station 40 is taken as the receiving end with respect to data flowing between them via a mobile channel 30. It should be understood that both base station 20 and mobile station 40 can transmit and receive, and each must perform a rate determination when functioning as a receiving end. Consequently, where the context permits for generality purposes, base station 20 is referred to as a transmitting end 20, and mobile station 40 is referred to as a receiving end 40. It should also be appreciated that the functional blocks shown are conceptual as viewed by persons of ordinary skill in the art, who are well aware that many are appropriately implemented by a digital signal processor and/or microprocessor utilizing firmware together with an application specific integrated circuit (ASIC).

At transmitting end 20, after analog-to-digital conversion of inputted analog human speech (not shown), the digitized speech is processed by a variable-rate speech encoder 21, which pursuant to IS-95 may be based on the Qualcomm Code-Excited-Linear-Prediction (QCELP) voice encoding algorithm. The variable-rate feature forms an integral part of the Voice Activity Detection (VAD) approach employed in the considered system, wherein either Rate Set 1 or Rate Set 2 of IS-95 is used.

As usual in digital communication models, source encoding is followed by channel encoding, which is realized as a convolutional encoder and symbol repeater 22, the output of which are frames containing a plurality of possibly repeated symbols. In order to overcome the effects of noise and interference introduced into the signal during transmission through the channel, convolutional encoding adds, in a controlled manner, redundancy in the data sequence. The four rates of Rate Set 1 after convolutional encoding are 19.2 kbps (Full Rate), 9.6 kbps (Half Rate), 4.8 kbps (Quarter Rate) and 2.4 kbps (Eighth Rate). Rate Set 2 provides the four possible rates 28.8 kbps, 14.4 kbps, 7.2 kbps and 3.6 kbps. An additional puncturing is performed in Rate Set 2 by deleting two symbols out of six. In order to maintain a constant transmission rate of 19.2 kbps, the encoded symbols are repeated once, three times and seven times for Half Rate frames, Quarter Rate frames and Eighth Rate frames, respectively.

The reliability of the information transmission using convolutional encoding will only increase when the errors caused by the channel are statistically independent. In fact, the mobile channel 30 is characterized by multipath and fading. Therefore, errors will appear in clusters. As an effective way for transforming a burst error channel into a channel having independent errors, interleaving of the coded data is employed. Block interleaver 23 permutes the sequence of symbols received from convolutional encoder and symbol repeater 22 by formatting them in a rectangular array and reading them out column-wise. The described procedure achieves time diversity in the data sequence which results in a "broken" channel memory. Next, a long code scrambler 24 combines the data sequence with a maximum length Pseudo Noise (PN) sequence (long code) of period $2^{42}-1$ by using a modulo-2 addition (not shown). A unique offset of the long code for each forward traffic channel enables voice privacy. Walsh Cover block 25 combines the scrambled and coded symbols from long code scrambler 24 with a row of a dimension-64 Hadamard matrix. This process provides orthogonal channelization (in the absence of multipath) among all transmitted channels of one base station. In Quadrature BPSK/ PN Code Scrambler block 26, the data stream is again scrambled by the so-called PN short code (also pilot PN sequence), a PN code of period $2^{15}-1$, by applying Binary Phase Shift Keying (BPSK) modulation with two separate PN short codes to two quadrature branches carrying the same signal. By using the short code, the mobile stations 40 can distinguish between base stations.

The receiving end or mobile station 40 in general reverses the operations done at the transmitting end. As is well known, a cascade of a rake receiver/quadrature BPSK demodulation/PN code descrambler block 41, Walsh uncover block 42, long code descrambler 43, and block deinterleaver receive from mobile channel 30 plural versions of the transmitted signal which are relatively delayed due to multipath and recovers a sequence of symbols at an unknown data rate. Block deinterleaver 44 reverses the interleaving by formatting received symbols in a rectangular array and reading them out row-wise to produce the signal or series of symbols $y_{deint}$. In the processing of a sequence of digital symbols, it is convenient to group them into soft symbols which have a length of a plurality of bits. We have used soft symbols for $y_{deint}$ which are four bits in length, and are interpreted as indicating a double ended range of 15 possible levels, corresponding to the integer values ranging from −7 to +7.

Next, the de-repetition and Viterbi decoding block 45 performs any needed de-repetition and decodes the convolutional encoded data sequence to produce $y_{info}$. As is well known, a Viterbi decoding process recursively finds the most likely state transition sequence in a trellis. In order to accomplish the decoding, block 45 must determine the data rate on a frame by frame basis. Lastly, the Viterbi decoded data $y_{info}$ at the determined data rate is applied to a variable rate speech decoder 46 which obtains a high quality digital voice signal that is applied to a digital to analog converter (not shown).

Figure 2:
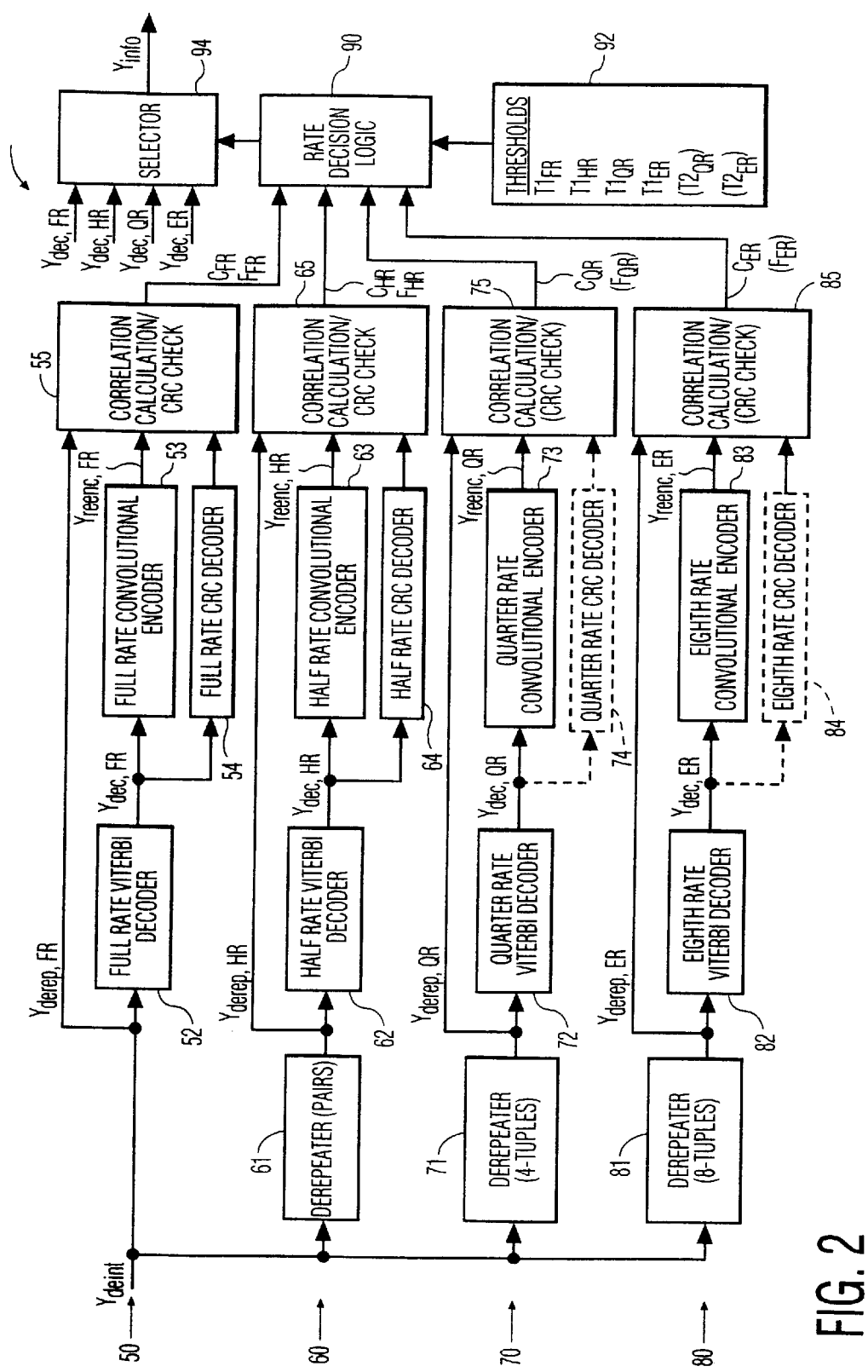
FIG. 2 is a functional schematic diagram of the de-repetition and Viterbi decoding block in FIG. 1 including a rate classification logic block.

De-repetition and Viterbi decoding block 45 is shown in more detail in FIG. 2, and is seen to comprise four branches 50, 60, 70, and 80 to which the de-interleaved data or series of symbols $y_{deint}$ is applied. The branches separately compute scaled correlations $C_{FR}$, $C_{HR}$, $C_{QR}$, and $C_{ER}$ between data entering the Viterbi decoder $y_{derep,FR}$, $y_{derep,HR}$, $y_{derep,QR}$, and $y_{derep,ER}$ and re-encoded data $y_{reenc,FR}$, $y_{reenc,HR}$, $Y_{reenc,QR}$, and $y_{reenc,ER}$ for each of full rate, half rate, quarter rate, and eighth rate, respectively, in the applicable rate set, and CRC checking results $F_{FR}$, $R_{HR}$, $F_{QR}$, and $F_{ER}$ for all rates except quarter rate and eighth rate in IS-95 Rate Set 1, and provide the correlations and available CRC checking results to rate decision or classification logic 90 which makes a rate decision $R_{dec}$. In response to rate decision $R_{dec}$ a selector 94 selects the indicated decoded signal among $y_{dec,FR}$, $y_{dec,HR}$, $y_{dec,QR}$, and $y_{dec,ER}$ as the output data $y_{info}$ from de-repetition and Viterbi decoder block 45.

For Rate Set 1, there are 384 symbols in a full rate frame and the scaled correlations $C_{FR}$, $C_{HR}$, $C_{QR}$, and $C_{ER}$ are formed for a frame in accordance with the following equations, wherein both the re-encoded symbols $y_{reenc,FR}$, $y_{reenc,HR}$, $Y_{reenc,QR}$, and $y_{reenc,ER}$ and the symbols $y_{derep,FR}$, $y_{derep,HR}$, $y_{derep,QR}$, and $y_{derep,ER}$ entering the decoder have interger values ranging from −7 to +7:

$$C_{FR} = \sum_{i=0}^{383} y_{reenc,FR}(i) \cdot y_{derep,FR}(i)$$

$$C_{HR} = 2 \cdot \sum_{i=0}^{191} y_{reenc,HR}(i) \cdot y_{derep,HR}(i)$$

$$C_{QR} = 4 \cdot \sum_{i=0}^{95} y_{reenc,QR}(i) \cdot y_{derep,QR}(i)$$

$$C_{ER} = 8 \cdot \sum_{i=0}^{47} y_{reenc,ER}(i) \cdot y_{derep,ER}(i)$$

and CRC checking results $F_{FR}$ and $F_{HR}$ are available only for full and half rates. If CRC fails, the CRC checking result is set to logical one; otherwise the CRC checking result has the value logical zero indicating that CRC checking has not failed.

For Rate Set 2, there are 576 symbols in a full rate frame and the scaled correlations $C_{FR}$, $C_{HR}$, $C_{QR}$, and $C_{ER}$ are formed for a frame in accordance with the following equations, again wherein both the re-encoded symbols $y_{reenc,FR}$, $y_{reenc,HR}$, $Y_{reenc,QR}$, and $y_{reenc,ER}$, and symbols $y_{derep,FR}$, $y_{derep,HR}$, $y_{derep,QR}$, and $y_{derep,ER}$ entering the decoder have integer values ranging from −7 to +7:

$$C_{FR} = \sum_{i=0}^{575} y_{reenc,FR}(i) \cdot y_{derep,FR}(i)$$

$$C_{HR} = 2 \cdot \sum_{i=0}^{287} y_{reenc,HR}(i) \cdot y_{derep,HR}(i)$$

$$C_{QR} = 4 \cdot \sum_{i=0}^{143} y_{reenc,QR}(i) \cdot y_{derep,QR}(i)$$

$$C_{ER} = 8 \cdot \sum_{i=0}^{71} y_{reenc,ER}(i) \cdot y_{derep,ER}(i)$$

CRC checking results $F_{FR}$, $F_{HR}$, $F_{QR}$, and $F_{ER}$ are available for full, half, quarter, and eighth rates, respectively. Again if CRC checking fails, the CRC checking result is set to logical one; otherwise the CRC checking result has the value logical zero indicating that the CRC checking has not failed.

Thus, in branch 50 the de-interleaved data $Y_{deint}$ (which for purposes of symmetry is defined as full rate de-repeated data $y_{derep,FR}$) is applied to full rate Viterbi decoder 52 to produce decoded full rate data $y_{dec,FR}$. The decoded full rate data $y_{dec,FR}$ is applied to full rate convolution encoder 53 to produce full rate re-encoded data $y_{reenc,FR}$ and is also applied to full rate CRC decoder 54. In block 55, the correlation $C_{FR}$ between full rate re-encoded data $y_{reenc,FR}$ and full rate de-repeated data $y_{derep,FR}$ is calculated and the CRC checking result $F_{FR}$ is determined.

In branch 60 the de-interleaved data $y_{deint}$ is applied to de-repeater 61 which extracts symbols from 2-tuples to form half rate de-repeated data $y_{derep,HR}$ which is in turn applied to half rate Viterbi decoder 62 to produce decoded half rate data $y_{dec,HR}$. The decoded half rate data $y_{dec,HR}$ is applied to half rate convolution encoder 63 to produce half rate re-encoded data $y_{derep,HR}$ and is also applied to half rate CRC decoder 64. In block 65, the correlation $C_{HR}$ between half rate re-encoded data $y_{reenc,HR}$ and half rate de-repeated data $y_{derep,HR}$ calculated and the CRC checking result $F_{HR}$ is determined.

In branch 70 the de-interleaved data $y_{deint}$ is applied to de-repeater 71 which extracts symbols from 4-tuples to form quarter rate de-repeated data $y_{derep,QR}$ which is in turn applied to quarter rate Viterbi decoder 72 to produce decoded quarter rate data $y_{dec,QR}$. The decoded quarter rate data $y_{dec,QR}$ is applied to quarter rate convolution encoder 73 to produce quarter rate re-encoded data $y_{reenc,QR}$ and, when the applicable rate set is Rate Set 2, is also applied to quarter rate CRC decoder 74. In block 75, the correlation $C_{QR}$ between quarter rate re-encoded data $y_{reenc,QR}$ and quarter rate de-repeated data $y_{derep,QR}$ is calculated and, when the applicable rate set is rate set 2, the CRC checking result $F_{QR}$ is determined.

Similarly, in branch 80 the de-interleaved data $y_{deint}$ is applied to de-repeater 81 which extracts symbols from 8-tuples to form eighth rate de-repeated data $y_{derep,ER}$ which is in turn applied to eighth rate Viterbi decoder 82 to produce decoded eighth rate data $y_{dec,ER}$. The decoded eighth rate data $y_{dec,ER}$ is applied to eighth rate convolution encoder 83 to produce eighth rate re-encoded data $y_{reenc,ER}$ and, when the applicable rate set is Rate Set 2, is also applied to eighth rate CRC decoder 84. In block 85, the correlation $C_{ER}$ between eighth rate re-encoded data $y_{reenc,ER}$ and eighth rate de-repeated data $y_{derep,ER}$ is calculated and, when the applicable rate set is Rate Set 2, the CRC checking result $F_{ER}$ is determined.

In accordance with the present invention the rate decision or classification logic 90 is quite simple, utilizing the scaled correlations $C_{FR}$, $C_{HR}$, $C_{QR}$, and $C_{ER}$, the available CRC checking results $F_{FR}$, $F_{HR}$, and for Rate Set 2, $F_{QR}$ and $F_{ER}$, and at most six predetermined thresholds 92 comprising biasing thresholds $T1_{FR}$, $T1_{HR}$, $T1_{QR}$, and $T1_{ER}$ for the various possible rates in the applicable rate set, and for Rate Set 1, thresholds $T2_{QR}$ and $T2_{ER}$.

Figure 3:
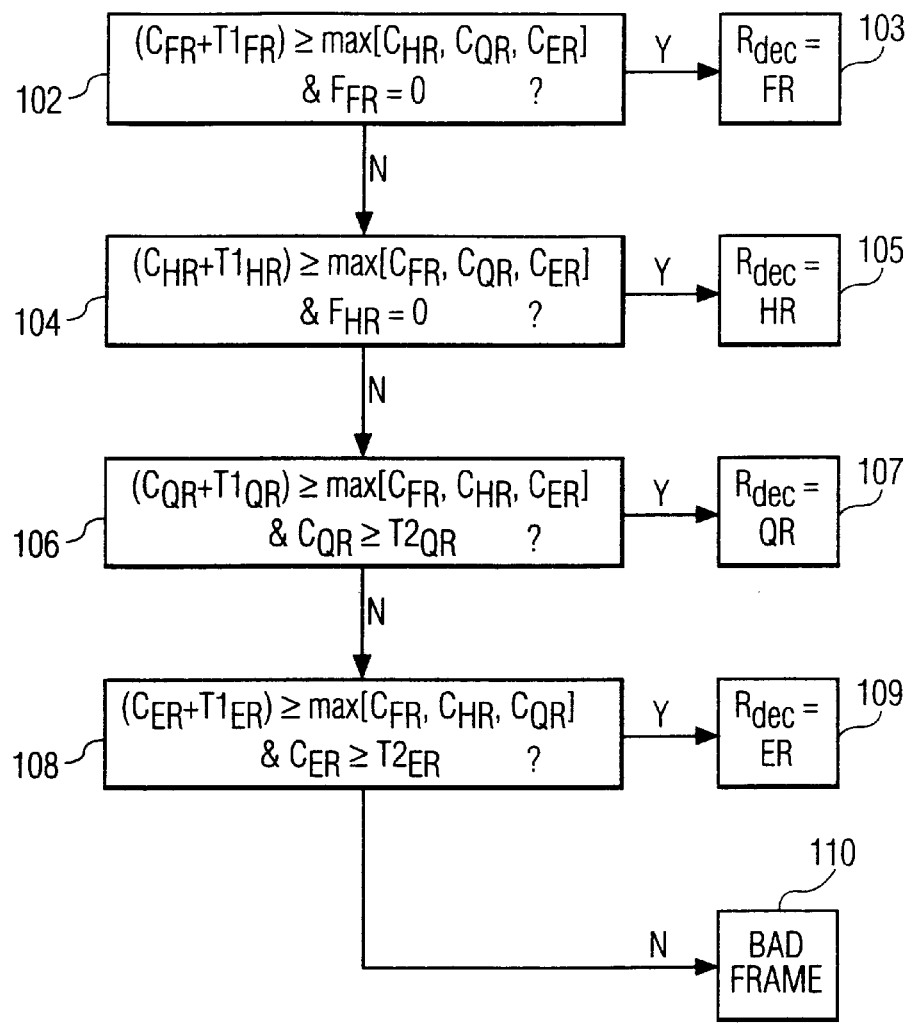
FIG. 3 is a flow chart of the logical operations performed by the rate classification logic block in FIG. 2 for IS-95 Rate Set 1 in accordance with the principles of the present invention.

As shown in FIG. 3 for Rate Set 1, rate decision logic sequentially considers the full and lower candidate data rates in descending order, choosing the currently considered candidate data rate to be the actual data rate if two conditions are met. One of these conditions is whether the correlation plus the biasing threshold for the considered rate is greater than or equal to the maximum of the correlations for the other rates. The other condition is that CRC checking, if available for the considered rate, has not failed, and if CRC checking is not available, whether the correlation is greater than or equal to the further threshold for the considered rate.

Thus, in block 102 it is determined for the full rate if:

$$\{(C_{FR}+T1_{FR}) \geq \max[C_{HR}, C_{QR}, C_{ER}]\} \& \{F_{FR}=0\}$$

If true, block 103 is reached and the rate decision $R_{dec}$=FR is made. On the other hand; if not true block 104 is reached where it is determined for the half rate if:

$$\{(C_{HR}+T1_{HR}) \geq \max[C_{FR}, C_{QR}, C_{ER}]\} \& \{F_{HR}=0\}$$

If true, block 105 is reached and the rate decision $R_{dec}$=HR is made. On the other hand, if not true block 106 is reached where it is determined for the quarter rate if:

$$\{(C_{QR}+T1_{QR}) \geq \max[C_{FR}, C_{HR}, C_{ER}]\} \& \{C_{QR} \geq T2_{QR}\}$$

If true, block 107 is reached and the rate decision $R_{dec}$=QR is made. On the other hand, if not true block 108 is reached where it is determined for the eighth rate if:

$$\{(C_{ER}+T1_{ER}) \geq \max[C_{FR}, C_{HR}, C_{QR}]\} \& \{C_{ER} \geq T2_{ER}\}$$

If true, block 109 is reached and the rate decision $R_{dec}$=ER is made. On the other hand, if not true block 110 is reached where it is determined that the frame is a bad frame.

Figure 4:
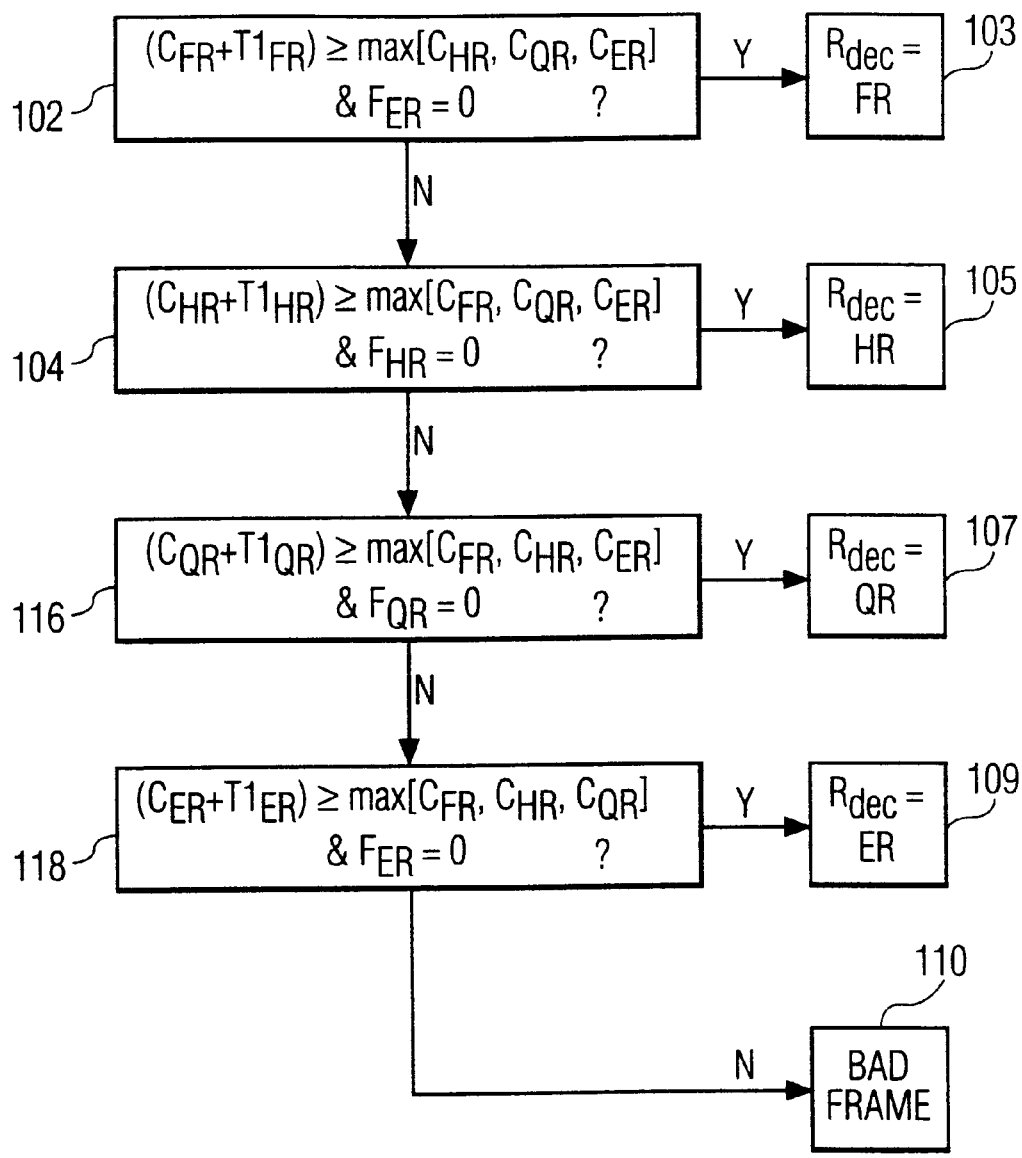
FIG. 4 is a flow chart of the logical operations performed by the rate classification logic block in FIG. 2 for IS-95 Rate Set 2 in accordance with the principles of the present invention.

As shown in FIG. 4, for Rate Set 2, since CRC checking is available for all rates, blocks 116 and 118 are employed which determine for the quarter rate eight if:

$$\{(C_{QR}+T1_{QR}) \geq \max[C_{FR}, C_{HR}, C_{ER}]\} \& \{F_{QR}=0\}$$

and determine for the eighth rate if:

$$\{(C_{ER}+T1_{ER}) \geq \max[C_{FR}, C_{HR}, C_{ER}]\} \& \{F_{ER}=0\}$$

It should be appreciated that the aforementioned logic effectively means that one of the conditions tested is whether the correlations for a considered data plus a biasing threshold associated with the considered data rate is greater than or equal to the largest of the correlations for the other data rates. It should also be appreciated that the various inequalities would work if the relationship "greater than" is used rather than "greater than or equal to" with a slight or no change in the actual predetermined values used for the thresholds.

The threshold values for both rate sets are given in the table below and have been determined to provide good results under expected noise and fading conditions:

| Threshold | Rate Set 1 | Rate Set 2 |
|---|---|---|
| $T1_{FR}$ | 59 | 175 |
| $T1_{HR}$ | 0 (not used) | 95 |
| $T1_{QR}$ | −20 | 112 |
| $T1_{ER}$ | 0 (not used) | 200 |
| $T2_{QR}$ | 1195 | — |
| $T2_{ER}$ | 1122 | — |

As appears from the above table, in actuality biasing thresholds $T1_{HR}$ and $T1_{ER}$ are set to zero for Rate Set 1, so effectively, they are not used.

Figure 5:
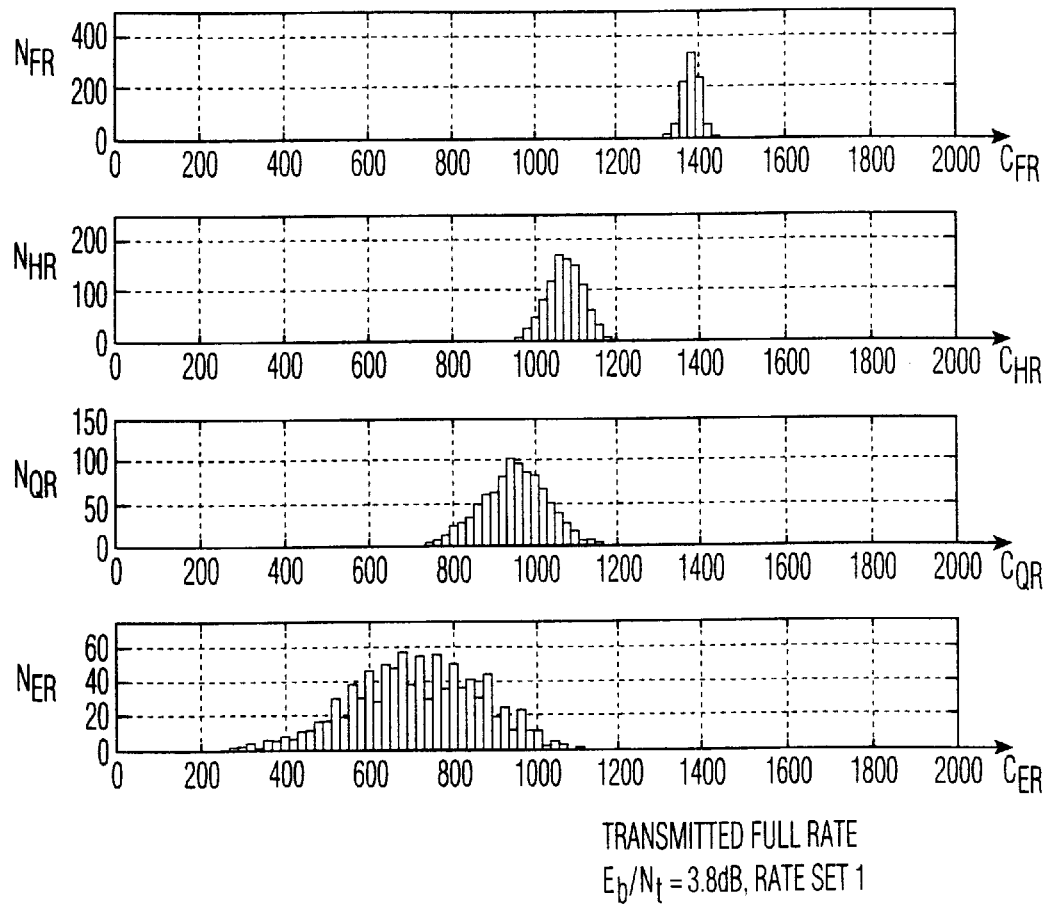
FIGS. 5 through 7 are histograms of scaled correlations for each of full rate, half rate, quarter rate and eighth rate under different conditions of noise and fading.
Figure 6:
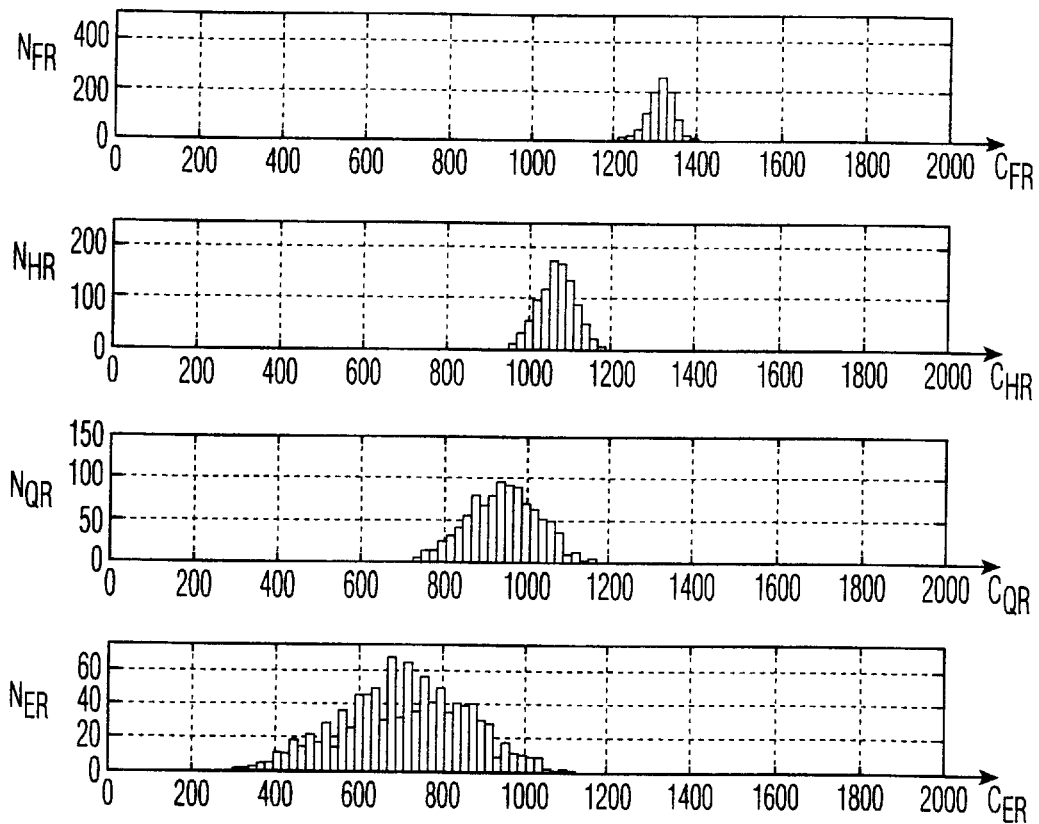
Figure 7:
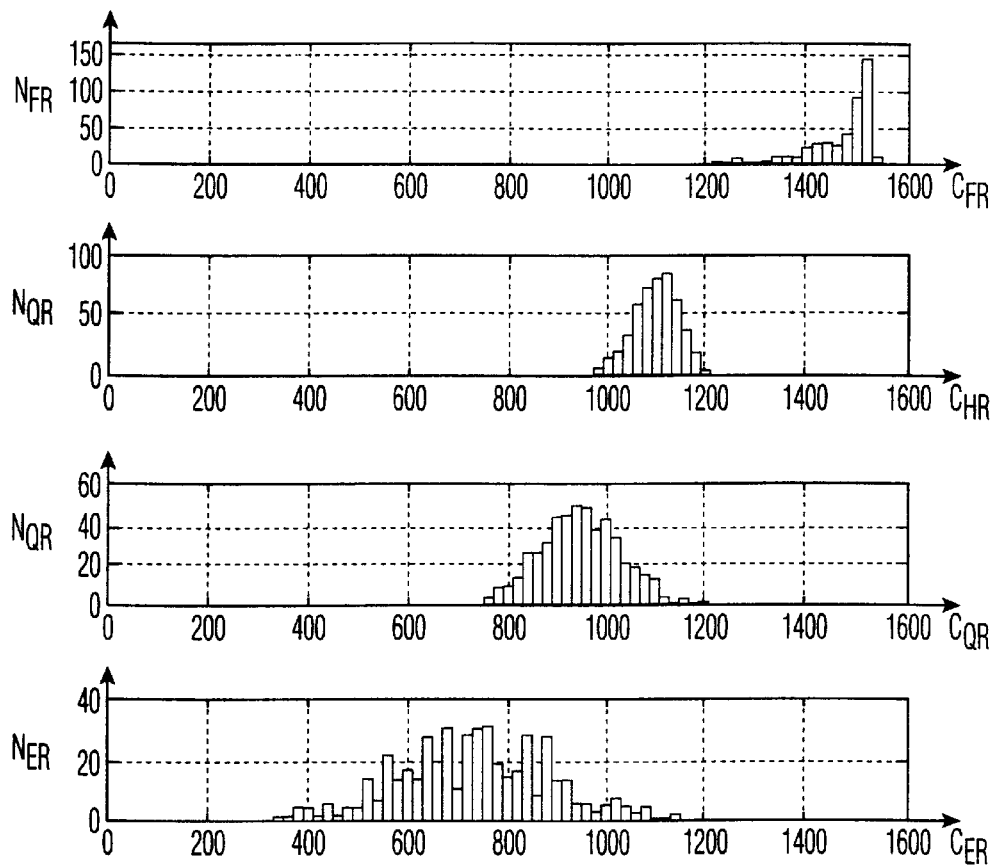

The reason that two conditions are used to test for each data rate is to achieve sufficient frame quality under different conditions of noise and fading. As an example, FIGS. 5, 6, and 7 show the distributions of the scaled correlations with respect to data transmitted full rate in accordance with Rate Set 1 under different conditions of noise and fading. In FIG. 5, there is an energy per bit to noise ratio $E_b/N_t$=3.8 dB under Additive White Gaussian Noise (AWGN) with no fading, in FIG. 6, there is there is an energy per bit to noise ratio $E_b/N_t=2.6$ dB under AWGN, and in FIG. 6 there is an energy per bit to noise ratio $E_b/N_t=12.8$ dB under AWGN and but also IS-98. Fading__1 conditions are assumed. As appears, the distributions widen as noise or fading increases.

It should now be appreciated that the objects of the present invention have been satisfied. While the present invention has been described in, particular detail, it should also be appreciated that numerous modifications are possible within the intended spirit and scope of the invention. In interpreting the appended claims it should be understood that:

a) the word "comprising" does not exclude the presence of other elements or steps than those listed in a claim;

b) the word "a" or "an" preceding an element does not exclude the presence of a plurality of such elements.

c) any reference signs in the claims do not limit their scope; and d) several "means" may be represented by the same item of hardware or software implemented structure or function.

What is claimed is:

1. A method of rate detection at a receiving end of a digital communications system of a type wherein convolutional encoded digital data transmitted over a medium has an information data rate variably selected at a transmitting end from a rate set containing a full rate and one or more possible lower rates which equals the full rate divided by respective different integers associated with the possible lower rates, the data being repeated for the lower rates to achieve the same apparent transmission rate as the full rate, said method comprising:

de-repeating received convolutional encoded data in accordance with each of the possible lower rates;

decoding the received convolutional encoded data and each of the de-repeated convolutional encoded data which has been de-repeated in accordance with each of the possible lower rates;

convolutional re-encoding the decoded received convolutional encoded data and each of the de-repeated convolutional encoded data which has been de-repeated in accordance with each of the possible lower rates;

forming a full rate correlation between the received convolution encoded data and the convolution re-encoded decoded received convolution encoded data, and lower rate correlations between the de-repeated received convolution encoded data and the convolution re-encoded decoded de-repeated received convolution encoded data for each possible lower rate, the lower rate correlations being scaled by the integers associated with the lower rates; and first determining whether or not the transmitted data rate is the full rate by checking if one or more first conditions are satisfied, one of the first conditions being whether the full rate correlation plus a predetermined first threshold is greater than, or greater than or equal to, a maximum of the lower rate correlations.

2. The method as claimed in claim 1, where a further one of the first conditions is whether a Cyclic Redundancy Code check with respect to the decoded received convolution encoded data does not fail.

3. The method as claimed in claim 1, further comprising second determining whether or not the transmitted data rate is the largest of the lower possible rates by checking if one or more second conditions are satisfied, one of the second conditions being whether the lower rate correlation for the largest of the lower possible rates plus a predetermined second threshold is greater than, or greater than or equal to, a maximum of the full rate correlation and the other of the lower rate correlations.

4. The method as claimed in claim 3, where a further one of the first conditions is whether a Cyclic Redundancy Code check with respect to the decoded received convolution encoded data does not fail.

5. The method as claimed in claim 1, where a further one of the second conditions is whether a Cyclic Redundancy Code check with respect to the decoded de-repeated received convolution encoded data for the largest of the possible lower data rates does not fail.

6. The method as claimed in claim 3, further comprising third determining whether or not the transmitted data rate is the second largest of the lower possible rates by checking if one or more third conditions are satisfied, one of the third conditions being whether the lower rate correlation for the second largest of the lower possible rates plus a predetermined third threshold is greater than, or greater than or equal to, a maximum of the full rate correlation and the other of the lower rate correlations.

7. The method as claimed in claim 6, where a further one of the first conditions is whether a Cyclic Redundancy Code check with respect to the decoded received convolution encoded data does not fail.

8. The method as claimed in claim 7, where a further one of the second conditions is whether a Cyclic Redundancy Code check with respect to the decoded de-repeated received convolution encoded data for the largest of the possible lower data rates does not fail.

9. The method as claimed in claim 8, where a further one of the third conditions is whether a Cyclic Redundancy Code check with respect to the decoded de-repeated received convolution encoded data for the second largest of the possible lower data rates does not fail.

10. The method as claimed in claim 9, where a further one of the third conditions is whether the lower rate correlation for the second largest of the possible lower rates is greater than, or is greater than or equal to, a predetermined fourth threshold.

11. The method as claimed in claim 6, further comprising fourth determining whether or not the transmitted data rate is the third largest of the lower possible rates by checking if one or more fourth conditions are satisfied, one of the fourth conditions being whether the lower rate correlation for the third largest of the lower possible rates plus a predetermined fourth threshold is greater than, or greater than or equal to, a maximum of the full rate correlation and the other of the lower rate correlations.

12. The method as claimed in claim 11, where a further one of the first conditions is whether a Cyclic Redundancy Code check with respect to the decoded received convolution encoded data does not fail.

13. The method as claimed in claim 12, where a further one of the second conditions is whether a Cyclic Redundancy Code check with respect to the decoded de-repeated received convolution encoded data for the largest of the possible lower data rates does not fail.

14. The method as claimed in claim 13, where a further one of the third conditions is whether a Cyclic Redundancy Code check with respect to the decoded de-repeated received convolution encoded data for the second largest of the possible lower data rates does not fail.

15. The method as claimed in claim 9, where a further one of the third conditions is whether the lower rate correlation for the second largest of the possible lower rates is greater than, or is greater than or equal to, a predetermined fifth threshold.

16. The method as claimed in claim 9, where a further one of the fourth conditions is whether the lower rate correlation for the third largest of the possible lower rates is greater than, or is greater than or equal to, a predetermined sixth threshold.

17. The method as claimed in claim 13, where a further one of the fourth conditions is whether a Cyclic Redundancy Code check with respect to the decoded de-repeated received convolution encoded data for the third largest of the possible lower data rates does not fail.

18. Apparatus for rate detection at a receiving end of a digital communications system of a type wherein convolutional encoded digital data transmitted over a medium has an information data rate variably selected at a transmitting end from a rate set containing a full rate and one or more possible lower rates which equals the full rate divided by respective different integers associated with the possible lower rates, the data being repeated for the lower rates to achieve the same apparent transmission rate as the full rate, said apparatus comprising:

means for de-repeating received convolutional encoded data in accordance with each of the possible lower rates;

means for decoding the received convolutional encoded data and each of the de-repeated convolutional encoded data which has been de-repeated in accordance with each of the possible lower rates;

means for convolutional re-encoding the decoded received convolutional encoded data and each of the de-repeated convolutional encoded data which has been de-repeated in accordance with each of the possible lower rates;

means for forming a full rate correlation between the received convolution encoded data and the convolution re-encoded decoded received convolution encoded data, and lower rate correlations between the de-repeated received convolution encoded data and the convolution re-encoded decoded de-repeated received convolution encoded data for each possible lower rate, the lower rate correlations being scaled by the integers associated with the lower rates; and rate decision means configured for first determining whether or not the transmitted data rate is the full rate by checking if one or more first conditions are satisfied, one of the first conditions being whether the full rate correlation plus a predetermined first threshold is greater than, or greater than or equal to, a maximum of the lower rate correlations.

19. The apparatus as claimed in claim 18, where a further one of the first conditions is whether a Cyclic Redundancy Code check with respect to the decoded received convolution encoded data does not fail.

20. The apparatus as claimed in claim 18, wherein the rate decision means is further configured for second determining whether or not the transmitted data rate is the largest of the lower possible rates by checking if one or more second conditions are satisfied, one of the second conditions being whether the lower rate correlation for the largest of the lower possible rates plus a predetermined second threshold is greater than, or greater than or equal to, a maximum of the full rate correlation and the other of the lower rate correlations.

* * * * *